United States Patent [19]

Page

[11] 4,336,630
[45] Jun. 29, 1982

[54] CASTER BRAKE

[75] Inventor: Lucille A. Page, Allen Park, Mich.

[73] Assignee: Rose Truck and Caster Company, Detroit, Mich.

[21] Appl. No.: 234,246

[22] Filed: Feb. 13, 1981

[51] Int. Cl.³ .............................................. B60B 33/00
[52] U.S. Cl. .................................................... 16/35 R
[58] Field of Search ......................................... 16/35 R

[56] References Cited

U.S. PATENT DOCUMENTS

| | | | |
|---|---|---|---|
| 918,636 | 4/1909 | Young | 16/35 R |
| 1,137,329 | 4/1915 | Johnson | 16/35 R |
| 1,863,349 | 6/1932 | Noelting et al. | 16/35 R |
| 2,227,832 | 1/1941 | Herold | 16/35 R |
| 2,434,863 | 1/1948 | Parkhill | 16/35 R |
| 3,467,981 | 9/1969 | Peter | 16/35 R |

Primary Examiner—Doris L. Troutman
Attorney, Agent, or Firm—Barnes, Kisselle, Raisch & Choate

[57] ABSTRACT

A caster brake construction comprising a base, a fork rotatably mounted on the base and having downwardly extending legs, an axle extending between the legs, and a wheel rotatably mounted on the axle. A washer is non-rotatably mounted on the axle exteriorly of one of the legs. A pedal is mounted on the axle exteriorly of the washer and has circumferentially spaced arcuate cam ways. Each cam way is tapered inwardly toward the center thereof and a plurality of circumferentially spaced projections on the washer normally engaging the deepest portions of the cam ways such that when the pedal is rotated in either direction from said normal position, the cam ways force the projections axially inwardly thereby forcing the one leg against the wheel to lock the wheel against rotation, and when the pedal is returned to its original position, the braking force is relieved.

10 Claims, 16 Drawing Figures

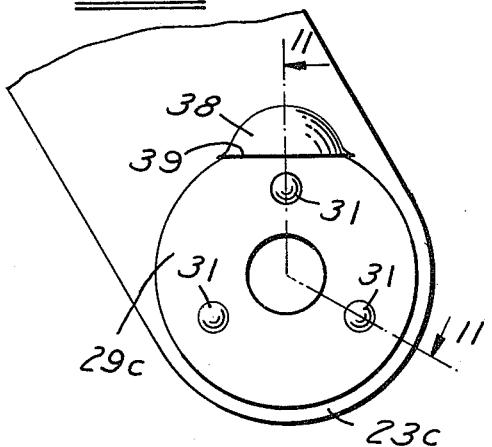
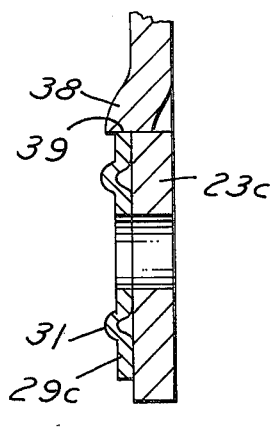
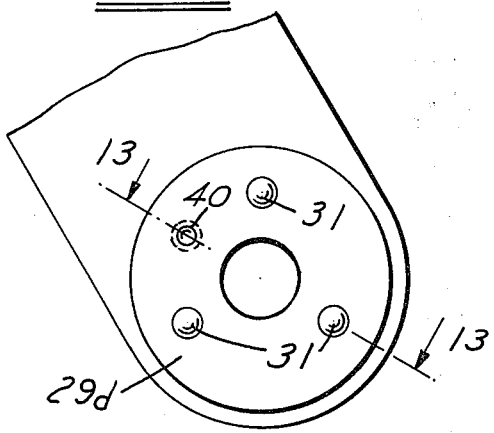
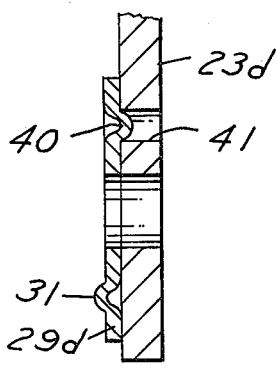
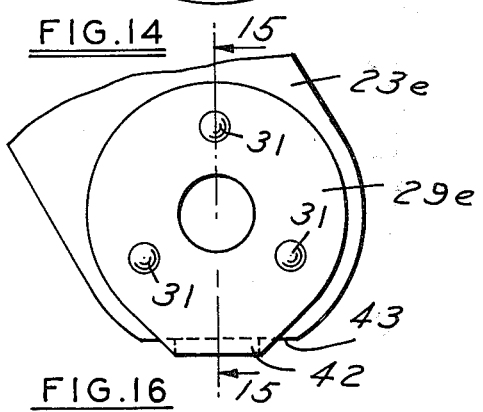
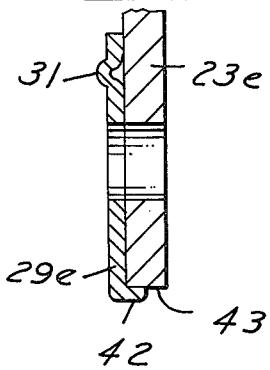
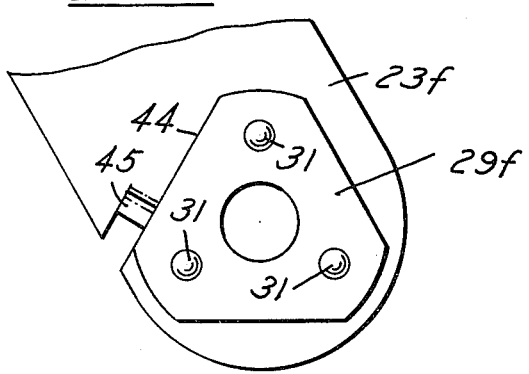

1

CASTER BRAKE

This invention relates to casters and particularly to caster brakes.

BACKGROUND AND SUMMARY OF THE INVENTION

Casters that are commonly used comprise a base and a yoke with downwardly extending legs, the yoke being rotatably mounted on the base. An axle extends between the legs and a wheel is rotatably mounted on the axle.

It is heretofore been suggested that brakes be provided for such casters. Thus, in U.S. Pat. No. 918,636, a pedal is rotatably mounted on the axle exteriorly of one leg. Radial projections on the leg and pedal are normally engaged and when it is desired to lock the wheel, depression of the pedal forces the projections out of engagement camming the leg against the wheel. In U.S. Pat. No. 1,137,329, the pedal is interposed between the leg and the wheel and a projection on the pedal engages the inner surface of the leg to press pedal against the brake. In U.S. Pat. No. 1,863,349, serrated plates are provided between the wheel and one leg and the pedal is mounted exteriorly of the leg and includes radial projections that are normally complementary to projections on the leg but are cammed out of such relationship when the pedal is rotated. U.S. Pat. No. 2,227,832 forms radial projections on one leg which engage radial grooves or cam ways on the axle which, in turn, is rotated by a pedal to actuate the brake. U.S. Pat. No. 3,467,981 provides for pins or plungers to be forced through the leg against the wheel by a pedal.

Each of the aforementioned constructions requires substantial modification of the caster and has the disadvantage that it cannot be readily adapted to conventional casters. Accordingly, among the objectives of the present invention are to provide a caster brake mechanism which can be readily adapted to conventional casters; which is simple in construction and relatively low in cost.

In accordance with the invention, a washer is nonrotatably mounted on the axle exteriorly of one of the legs, and a pedal is mounted on the axle exteriorly of the washer. The pedal has arcuate circumferentially spaced cam ways. Each cam way is tapered inwardly toward the center thereof and a plurality of circumferentially spaced projections on the washer normally engaging the deepest portions of the cam ways such that when the pedal is rotated in either direction from said normal position, the cam ways force the projections axially inwardly thereby forcing the one leg against said wheel to lock the wheel against rotation, and when the pedal is returned to its original position, the braking force is relieved.

DESCRIPTION OF THE DRAWINGS

FIG. 10 is a fragmentary side elevational view of a further modified form of caster brake.

FIG. 11 is a fragmentary sectional view taken along the line 11—11 in FIG. 10.

FIG. 12 is a fragmentary side elevational view of a further form of caster brake.

FIG. 13 is a fragmentary sectional view taken along the line 13—13 in FIG. 12.

FIG. 14 is a fragmentary side elevational view of a further modified form of caster brake.

FIG. 15 is a fragmentary sectional view taken along the line 15—15 in FIG. 14.

FIG. 16 is a fragmentary side elevational view of a further modified form of caster brake.

DESCRIPTION

Figure 1:
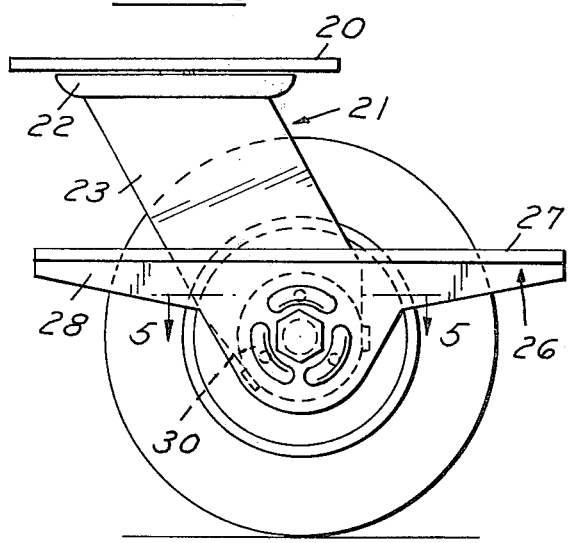
FIG. 1 is a side elevational view of a caster brake embodying the invention.
Figure 2:
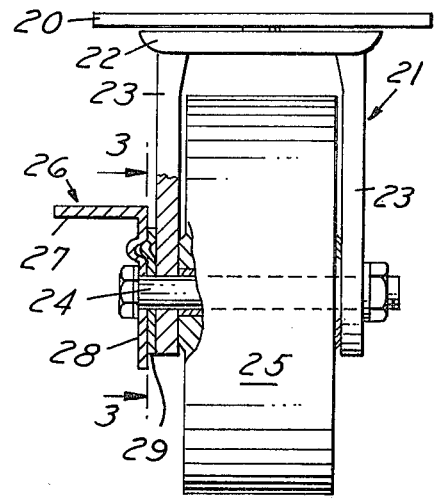
FIG. 2 is a front part sectional elevational view of the caster brake shown in FIG. 1.
Figure 4:
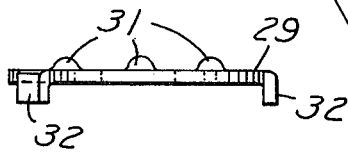
FIG. 4 is a side view of another portion of the caster brake.

Referring to FIGS. 1–5, the caster incorporating the caster brake embodying the invention comprises a base 20, a yoke 21 rotatably mounted on the base 20. The yoke comprises a ring plate 22 and spaced downwardly extending legs 23. An axle in the form of a bolt 24 extends between the legs 23 and a wheel 25 is rotatably mounted on the axle. The above-described construction is conventional in casters utilized on trucks and the like.

Figure 5:
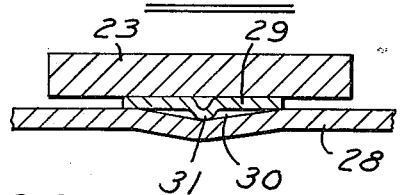
FIG. 5 is a fragmentary sectional view taken along the line 5—5 in FIG. 1.

The caster brake construction embodying the invention comprises a pedal bracket 26 having opposed generally horizontal foot engaging portions 27 and a vertical plate portion 28 rotatably mounted on the axle 24 and engaged by the head of bolt 24. A washer 29 is also mounted on the axle 24 between the plate 28 and one leg 23 of the yoke 21. The bracket 26 includes arcuate circumferentially spaced grooves 30 which form camways facing the washer 29. Each camway is tapered inwardly toward the center thereof as shown in FIG. 5. A plurality of circumferentially spaced projections 31 are provided on the washer 29 and have convex surfaces extending axially toward the camways 30 which normally engage the deepest portions of the camways 30. Washer 29 is retained against rotation with respect to its leg 23 by suitable means herein shown as tabs 32 on washer 29 which are bent over and engage the edges of the leg 23 at the juncture or tangency of the straight edges 33 and curved end 34.

With the bracket in the position shown in FIG. 1, the brake is disengaged but when the pedal bracket 26 is rotated in either direction by the foot, the camways 30 force the projections 31 axially inwardly thereby forcing the one leg 23 against the wheel 25 to lock the wheel against rotation. When the pedal bracket 26 is returned to its original position horizontally, the braking force is relieved.

Figures 3, 6:
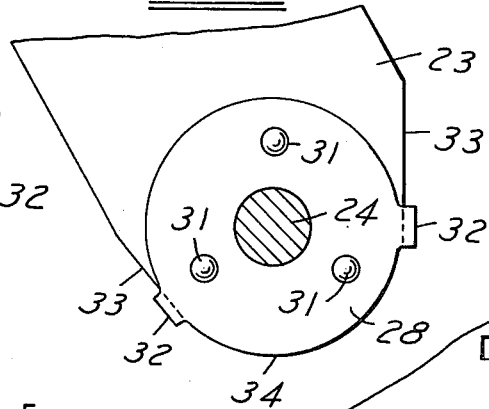
FIG. 3 is a fragmentary view taken along the line 3—3 in FIG. 2.
FIG. 6 is a fragmentary elevational view of a modified part.
Figure 7:
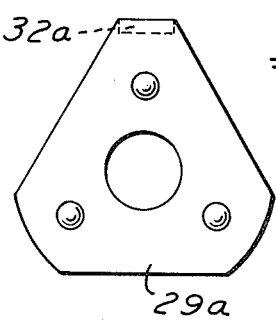
FIG. 7 is a side elevational view of a part adapted to be associated with the part shown in FIG. 6.
Figure 8:
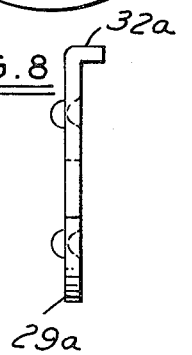
FIG. 8 is a side elevational view of the part shown in FIG. 7.

In the form of the invention shown in FIGS. 6–8, the washer 29a is prevented from rotation with respect to the leg 23a by a tab 32a bent out of the plane of washer 29a to engage a complementary slot 34a in the leg 23a. In all other respects, the brake lock is the same.

Figure 9:
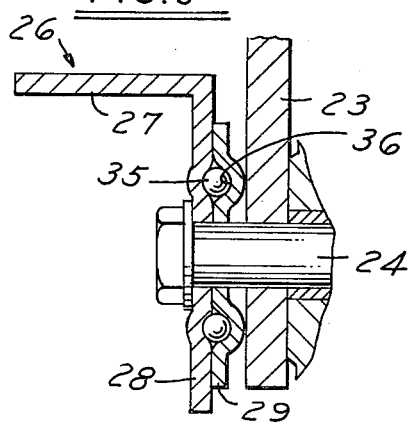
FIG. 9 is a vertical sectional view of a modified form of caster brake.

In the form of brake lock shown in FIG. 9, movement of the brake is facilitated by reversing washer 29 and bending tabs 32 in the opposite direction to engage the edges of the leg, and interposing balls 35 between the washer 29 and the pedal bracket 26. In this form, complementary recesses 36 in washer 29 formed by the opposite surfaces of projections 31 receive balls 35.

In the form of the invention shown in FIGS. 10 and 11, rotation between the washer 29c and the leg 23c is prevented by a lanced portion 38 of the leg 23c engaging a flat portion 39 on the washer 29c.

In the form of the invention shown in FIGS. 12 and 13, rotation between the washer 29d and the leg 23d is prevented by at least one axially inwardly extending depression 40 that engages an opening 41 extending entirely through the leg 23d.

In the form of the invention shown in FIGS. 14 and 15, rotation between the washer 29e and the leg 23e is prevented by a tab 42 on the washer 29e bent out of the plane of the washer and engaging a flat portion 43 on the lower end of the leg.

In the form of the invention shown in FIG. 16, rotation between the washer 29f and the leg 23f is prevented by providing flat sides 44 on the washer and having a portion 45 of the leg slit and bent out of the plane of the leg to engage one of the sides of the washer.

In each of the forms of the invention, the construction is such that a conventional caster can be readily converted to a caster incorporating a caster brake by the use of a single washer and a pedal bracket with minimal modifications or changes to either leg of the caster.

I claim:

1. A caster brake construction comprising
   a base,
   a yoke rotatably mounted on said base and having downwardly extending legs,
   an axle extending between said legs,
   a wheel rotatably mounted on said axle,
   a washer on said axle exteriorly of one of said legs,
   means between said one leg and said washer for preventing rotation of said washer relative to said one leg,
   a pedal mounted on said axle exteriorly of said washer,
   said pedal having arcuate camways at circumferentially spaced points thereof,
   each camway being tapered inwardly toward the center thereof,
   and a plurality of circumferentially spaced projections on said washer normally engaging the deepest portions of said camways such that when the pedal is rotated in either direction from said normal position, said camways force said projections axially inwardly thereby forcing said one leg against said wheel to lock said wheel against rotation, and when said pedal is returned to its original position, said braking force is relieved.

2. The brake construction set forth in claim 1 wherein said projections comprise integral portions of said washer deformed axially outwardly toward said camways.

3. The brake mechanism set forth in claim 1 wherein said projections comprise balls positioned in recesses in said washer and engaging said camways.

4. The brake mechanism set forth in claim 1 wherein said interengaging means preventing rotation between said washer and said one leg comprises an integral projection extending inwardly from said washer into a complementary recess in said one leg.

5. The brake mechanism set forth in claim 4 wherein said complementary recess and said one leg comprises an opening through the leg.

6. The brake mechanism set forth in claim 1 wherein said interengaging means preventing rotation between said washer and said one leg comprises a tab on said washer extending inwardly into a slot in said one leg.

7. The brake mechanism set forth in claim 1 wherein said interengaging means preventing rotation between said washer and said one leg comprises a portion of said one leg being lanced and engaging a complementary flat portion on said washer.

8. The brake mechanism set forth in claim 1 wherein said interengaging means preventing rotation between said washer and said one leg comprises a tab on said washer and a complementary portion on said leg onto which said tab is bent.

9. A caster brake construction comprising
   a base,
   a yoke rotatably mounted on said base and having downwardly extending legs,
   an axle extending between said legs,
   a wheel rotatably mounted on said axle,
   a washer on said axle exteriorly of one of said legs,
   said washer having portions thereof bent out of the plane thereof and engaging the edges of said leg to prevent rotation between said washer and said one leg,
   a pedal mounted on said axle exteriorly of said washer,
   said pedal having arcuate camways at circumferentially spaced points thereof,
   each camway being tapered inwardly toward the center thereof,
   and a plurality of circumferentially spaced projections formed on said washer to define axially outwardly extending convex surfaces and axially inwardly facing concave surfaces, said convex surfaces normally engaging the deepest portions of said camways such that when the pedal is rotated in either direction from said normal position said camways force said projections axially inwardly thereby forcing said one leg against said wheel to lock said wheel against rotation, and when said pedal is returned to its original position, said braking force is relieved.

10. The brake construction set forth in claim 9 wherein said leg includes a curved free edge and straight edges tangent to said curved edge, said portions of said washer engaging said leg at the area of juncture of said curved edge and straight edges.

* * * * *